United States Patent [19]
Kelly

[11] Patent Number: 6,067,190
[45] Date of Patent: *May 23, 2000

[54] MODULAR BINOCULAR ELECTRONIC IMAGING SYSTEM

[76] Inventor: Shawn L. Kelly, 8479 Pine Cove Dr., Commerce Township, Mich. 48382

[*] Notice: This patent is subject to a terminal disclaimer.

[21] Appl. No.: 09/262,884

[22] Filed: Mar. 8, 1999

Related U.S. Application Data

[63] Continuation of application No. 08/571,214, Dec. 12, 1995, which is a continuation-in-part of application No. 08/334,138, Nov. 4, 1994, abandoned, and a continuation of application No. 08/823,617, Mar. 25, 1997, Pat. No. 5,861,994.

[51] Int. Cl.[7] ............................ G02B 23/00; G02B 27/14
[52] U.S. Cl. ........................... 359/407; 359/462; 359/630
[58] Field of Search ............................ 359/405, 407–410, 359/480–482, 462–474, 629–633; 345/8

[56] References Cited

U.S. PATENT DOCUMENTS 5,673,146  9/1997  Kelly ....................................... 359/462
5,861,994  1/1999  Kelly ....................................... 359/630

*Primary Examiner*—Thong Nguyen
*Attorney, Agent, or Firm*—Lyon, P.C.

[57] ABSTRACT

A portable, electronic imaging system (100) includes a compact housing (102) extending across and beyond the eyes of the user, a wide field of view binocular viewfinder imaging subsystem (104) operating on an image produced by an electronic display subsystem (104) located within the housing, speakers (106) integrally mounted with the housing, an internal, interactive electronic control subsystem (108) to control the functions of the system, and an external input/output interface (110) to facilitate connection with a plurality of optional external devices and/or modules. The housing may further provide for modular mounting and removal of a plurality of optional system modules such as the electronic camera (120), a video tape record and playback device and battery (122), the electronic display (118), a night vision camera, a television tuner, a video game electronic system, a head orientation and position tracking device, or a means for mounting the system on the user's head.

20 Claims, 5 Drawing Sheets

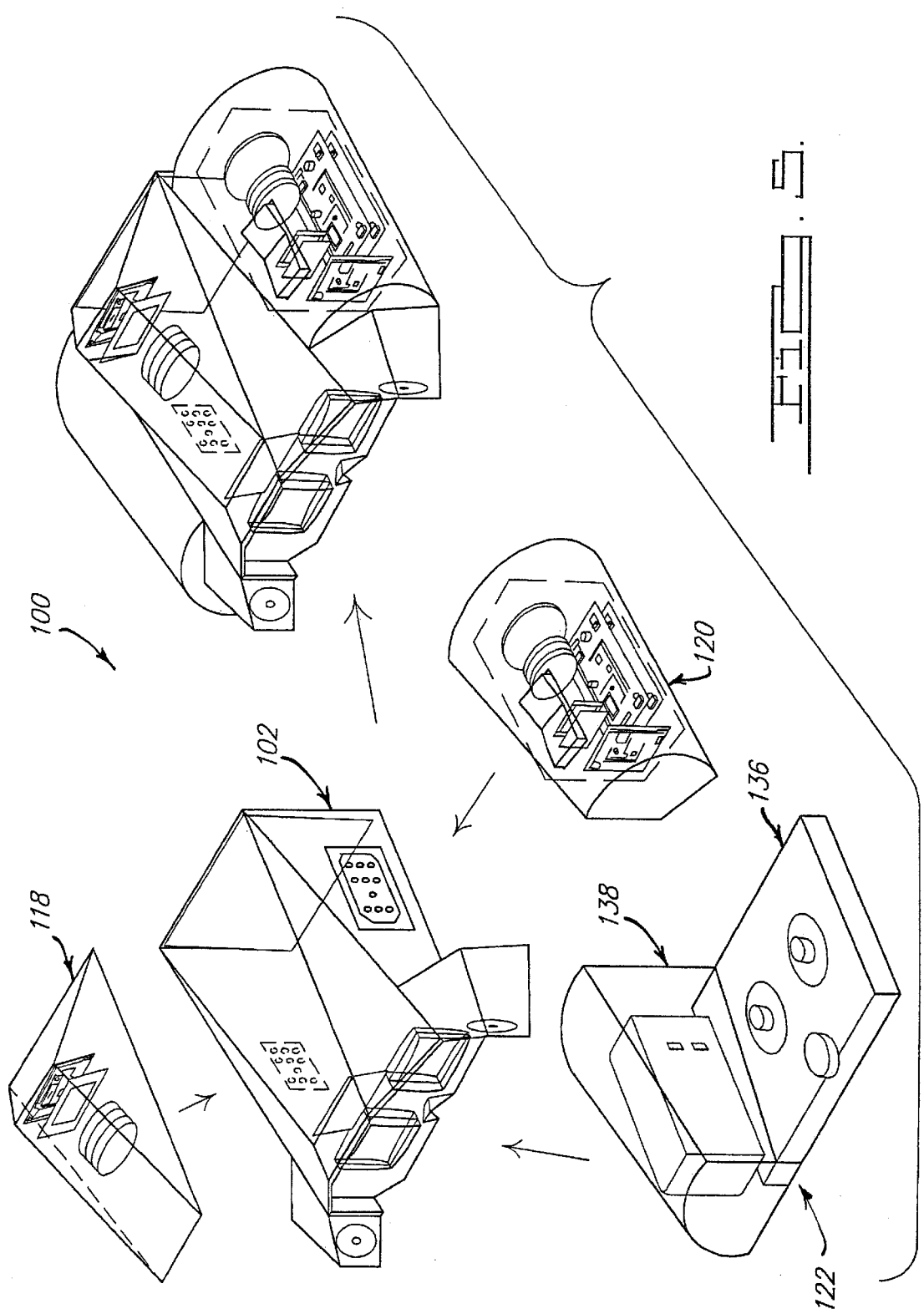

MODULAR BINOCULAR ELECTRONIC IMAGING SYSTEM

CROSS-REFERENCE TO RELATED APPLICATIONS

The instant application is a continuation of U.S. application Ser. No. 08/571,214, entitled "Reconfigurable Modular Binocular Electronic Imaging System with Pop-Up Display," filed on Dec. 12, 1995, which is a continuation-in-part of U.S. patent application Ser. No. 08/334,138, filed on Nov. 4, 1994, now abandoned in favor of its continuation, U.S. patent application Ser. No. 08/823,617, entitled "Modular Binocular Electronic Imaging System," filed on Mar. 25, 1997, now U.S. Pat. No. 5,861,994.

SUMMARY OF THE INVENTION

The present invention relates generally to portable imaging systems, and more particularly to a portable imaging system that produces a wide field of view and has a versatile design and utility.

BACKGROUND OF THE INVENTION

Portable electronic imaging systems employing an electronic image display internal to an optical viewing assembly are well known and are generally designed for two primary applications. The most common is the camcorder, comprising a monocular viewfinder to provide a magnified virtual view of the recorded scene. Such viewfinders provide only a limited apparent field of view and a limited exit pupil and eye relief, and further limit viewing to one eye, resulting in an inconvenient configuration for the user and limited utility for other applications. One solution to this problem has been to replace the viewfinder with a larger flat television display. This solution provides comfortable viewing by both eyes with no exit pupil and eye relief restrictions. However, a large display costs and weighs significantly more than the conventional viewfinder, requires a great amount of battery power, and also provides only a limited field of view.

The second common application of optical viewing assemblies in electronic imaging systems is the head mounted display for night vision or virtual reality applications. Typically employing a binocular or biocular optical system to view one or two display panels, such systems generally provide wider fields of view (i.e., greater than 40°) and larger exit pupils than camcorder viewfinders by employing more elaborate and expensive optical systems, larger display panels, or both. However, the greater cost of such systems combined with the limited utility of head mounted displays results in restricted markets and subsequently in restricted development and production resources.

Another significant problem which is common to both such portable electronic imaging systems is their limited utility, thereby restricting one application from sharing in the benefits of another. Simply stated, camcorders can not realistically enjoy the advantages of head mounted display imaging systems because such systems are too elaborate or too expensive. Conversely, head mounted display systems inherently do not benefit from the large market demand and the subsequent resources of the camcorder industry.

These imaging systems further share an inability to be upgraded with advances in display technology, requiring the user to purchase an entire new imaging system to exploit such advances.

Finally, it is well known that camcorders exhibit many characteristics which are often undesirable, including excessive weight, size, cost and incompatibility with different tape formats. Current camcorders also provide only monaural sound, requiring separate headphones to listen to the stereo capabilities inherent in such systems. Current camcorders also require the user to manage the camcorder's weight significantly from their body, causing greater fatigue than if one's hands are maintained more closely. Further, the narrow viewfinders of most camcorders may represent particular danger to the user's eye if the camcorder is bumped or if the user is in a dynamic situation. Such viewfinders also are inconvenient and sometimes difficult to use by people who wear eyeglasses. Yet further, viewfinder/displays of conventional camcorders do not provide supplemental utility as a monitor that can be viewed simultaneously by multiple persons.

SUMMARY OF THE INVENTION

It is therefore an object of the present invention to provide a reconfigurable or multiple use portable electronic imaging system that overcomes the above stated problems.

Another object of the present invention is to provide a versatile portable electronic imaging system which permits an internal electronic display to also function as an externally viewable image display.

It is a further object of the present invention to provide a portable electronic imaging system which has a housing configured to achieve a pop-up, externally viewable imaging display.

It is a further object of the present invention to provide a portable electronic imaging system that accommodates upgrades in display technology.

It is a further object of the present invention to provide a versatile camcorder having lighter weight, lower cost, and improved utility and compatibility.

It is a further object of the present invention to provide a portable electronic imaging system that further provides wide field of view imaging and decreased risk of injury to the user's eyes.

It is a further object of the present invention to provide a portable electronic imaging system that has greater buoyancy in water.

It is a further object of the present invention to provide a camcorder having a binocular viewfinder capable of accommodating use by people who wear eyeglasses.

It is a further object of the present invention to provide a modular binocular head mounted display apparatus.

In accordance with one aspect of the present invention, a reconfigurable, portable electronic imaging system comprises a base imaging subsystem comprising an electronic system control means and a viewfinder mounted within a main housing. The main housing is provided with a plurality of module connector ports externally arranged to facilitate detachable physical connection of a corresponding plurality of optional external system modules to the base imaging subsystem, wherein each of the plurality of optional external system modules comprises a module subsystem for either generating, processing, displaying, or recording an image, and wherein the base imaging subsystem reimages such image for viewing by a system user.

In accordance with another aspect of the present invention, an electronic imaging system comprises a portable housing, means for generating an electronic image representative of scenery external to the housing, an electronic display means supported by the housing for displaying the electronically generated image within the housing, and a binocular viewfinder supported by the housing for reimaging the displayed image for viewing by both eyes of a user. The binocular viewfinder comprises an imaging means for producing an apparent field of view of at least approximately 40°.

In accordance with yet another aspect of the present invention, a reconfigurable, portable electronic imaging system comprises a housing, and an electronic image display mounted to a hinge connected to the housing, wherein the hinge allows the electronic image display to be controllably positioned in either a first configuration where the image display is located within the housing and viewable through a reimaging means mounted to the housing, or a second configuration where the image display is positioned so as to be externally viewable relative to the housing.

In accordance with yet another aspect of the present invention, an electronic imaging system comprises a portable housing, means for generating an electronic image representative of scenery external to the housing, a pop-up electronic display means supported by the housing for internally displaying the electronically generated image within the housing when positioned in a first configuration, and displaying the generated images externally to the portable housing when positioned in a second configuration, and a binocular viewfinder means supported by the housing for reimaging the internally displayed image for viewing by both eyes of a user. The binocular viewfinder means comprises an imaging means for producing an apparent field of view of at least 40°.

Further stated, the present invention provides a portable electronic binocular imaging system having a compact housing extending across and beyond the eyes of the user, a central, wide field of view binocular viewfinder operating on an integral electronic display, an integral electronic video camera, stereo speakers mounted bilaterally on the left and right ends of the housing, an internal, interactive electronic control subsystem to control the overall operation of the system, and an external interface to connect the various system inputs and outputs from and to external devices. The system may further include an integral electronic tape record and playback device with a suitable battery. Also, in accordance with another novel aspect of the present invention, the housing may further or alternatively provide for modular mounting and removal of several system or accessory modules including the electronic camera, the tape record and playback device and battery, a replacement electronic display, a night vision camera, a television tuner, a video game electronic system, a system orientation tracking arrangement, a head orientation and position tracking device, or a means for mounting the system on the user's head. In accordance with yet another novel aspect of the present invention, the pop-up electronic display is hingeably mounted so as to provide dual viewing capabilities. The electronic display and internal electronic control subsystem may include means capable of providing viewing of two image sources simultaneously as a picture-in-picture arrangement or an entire overlap arrangement with the user determining the content and relative dominance (in the case of image overlap) of the respective images.

The present invention will be more fully understood upon reading the following detailed description of the preferred embodiment in conjunction with the accompanying drawings.

BRIEF DESCRIPTION OF THE DRAWINGS

FIGS. 6(a) and 6(b) are perspective views of the portable electronic imaging system of the present invention showing dual configurations of the display device.

DETAILED DESCRIPTION OF THE PREFERRED EMBODIMENT(S)

Figure 1:
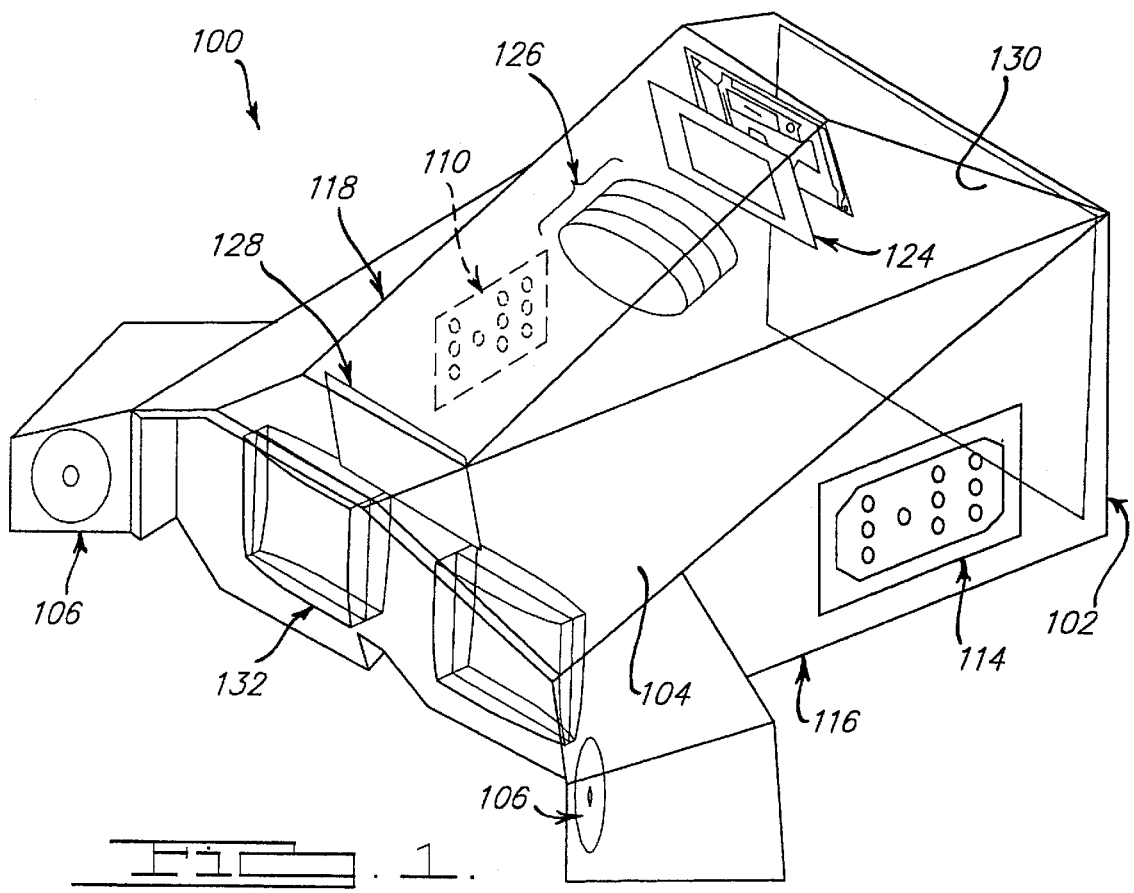
FIG. 1 is a perspective view illustrating a portable main housing/base imaging subsystem, and a display module coupled therewith in accordance with the present invention.
Figure 2:
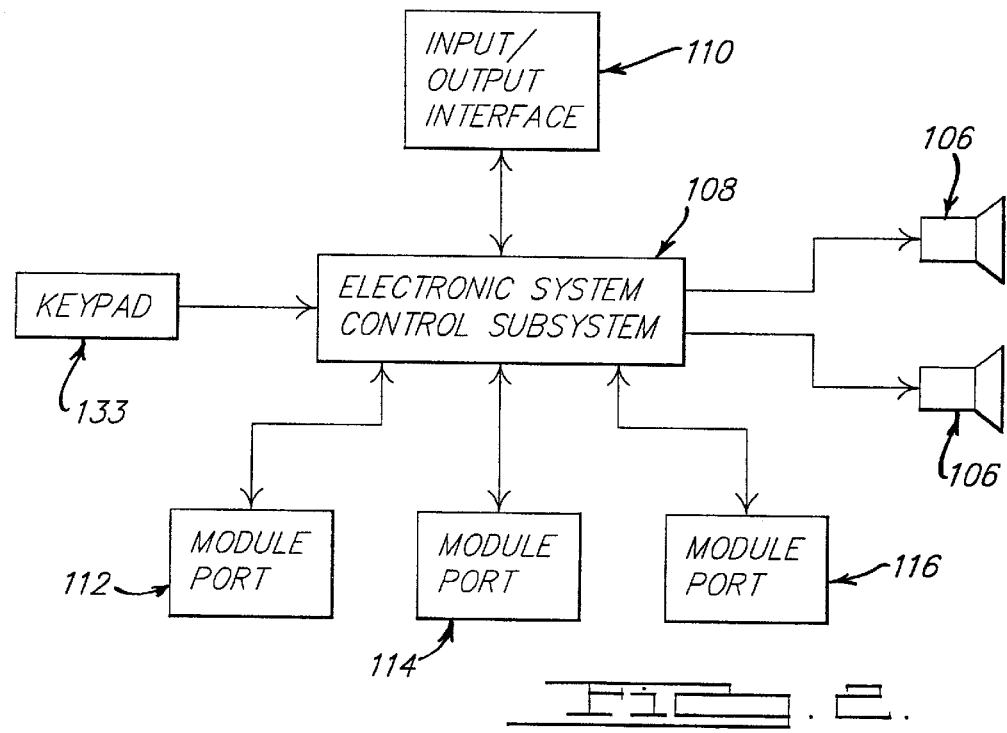
FIG. 2 is a diagram of the electronic control circuitry for the portable electronic imaging system of the present invention.
Figure 3A:
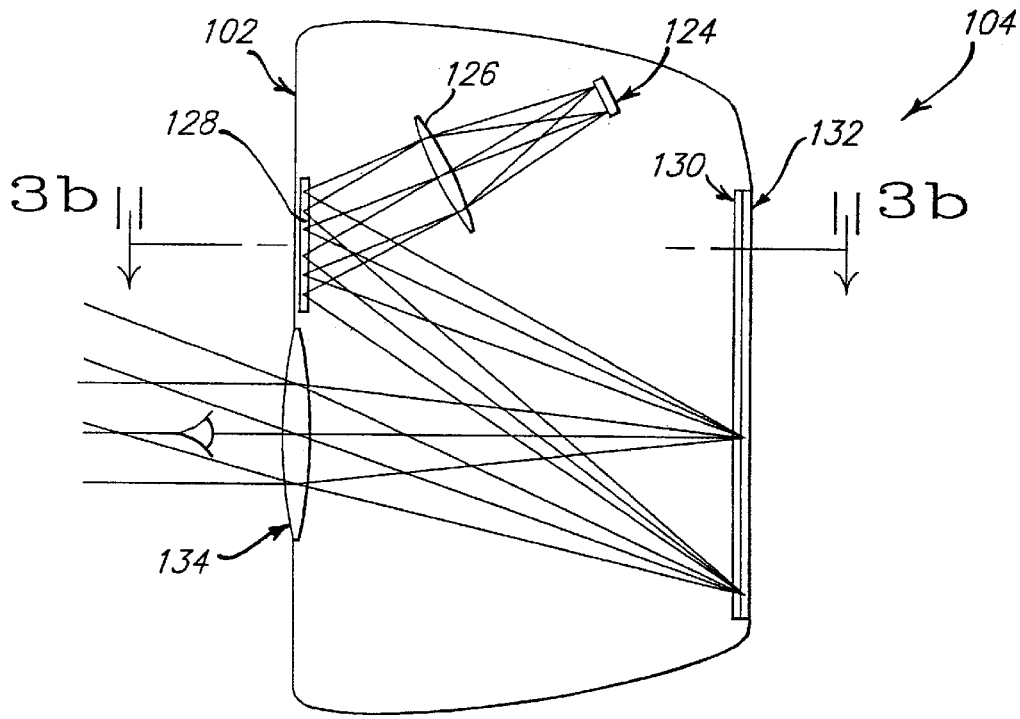
FIGS. 3(a) and 3(b) are an upper and side perspective view showing a diagrammatic illustration of the preferred binocular viewfinder system of the present invention.
Figure 3B:
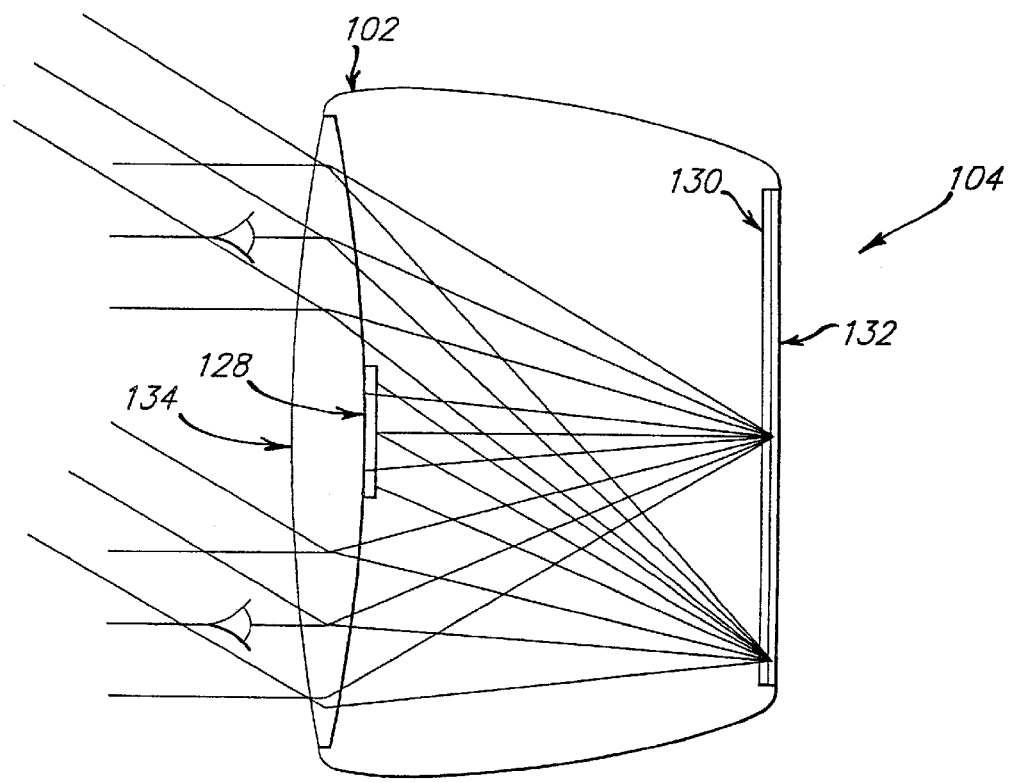
Figure 4:
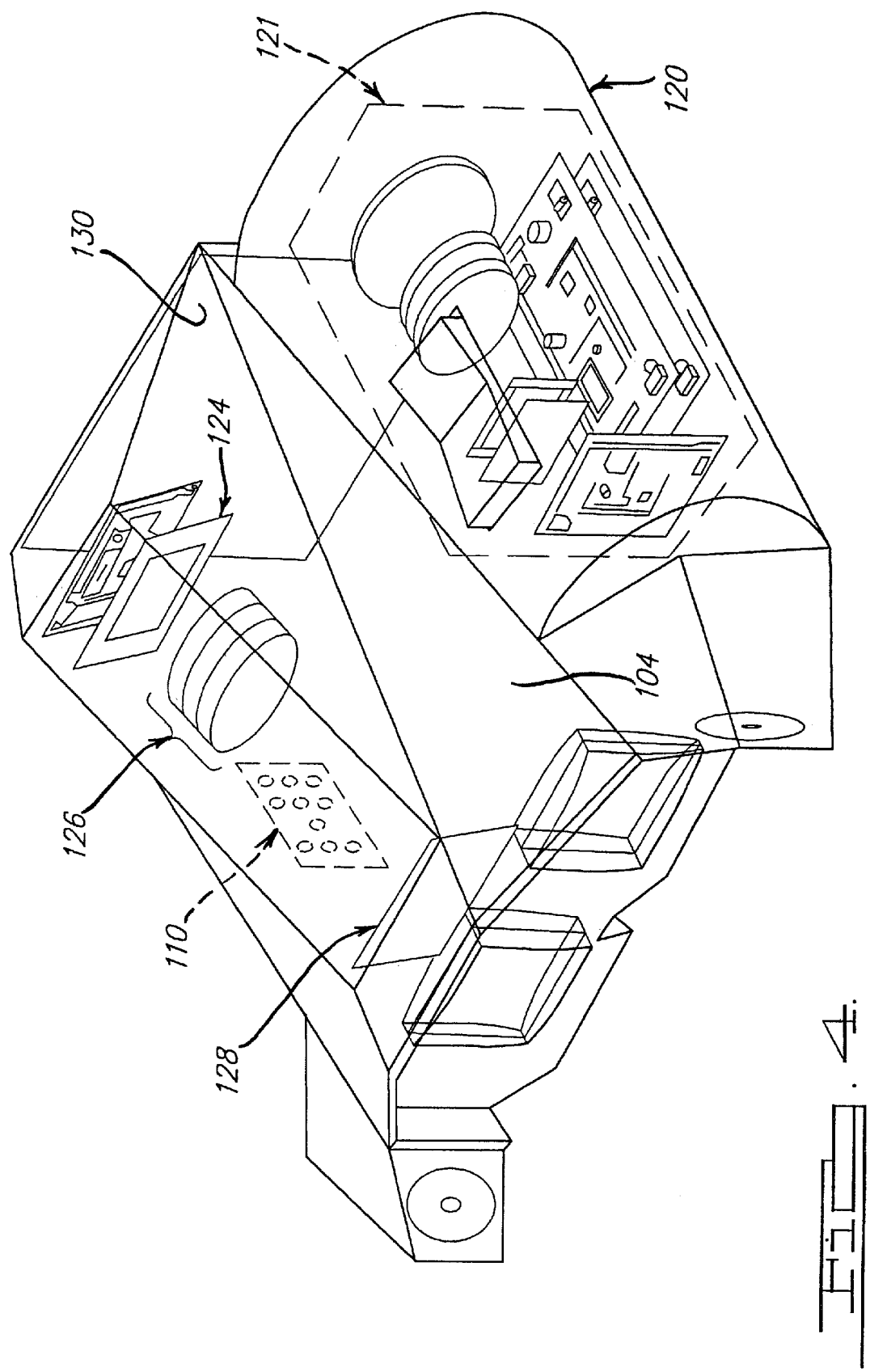
FIG. 4 is a perspective view illustrating a first optional external module coupled to the main housing in accordance with the present invention.
Figure 5A:
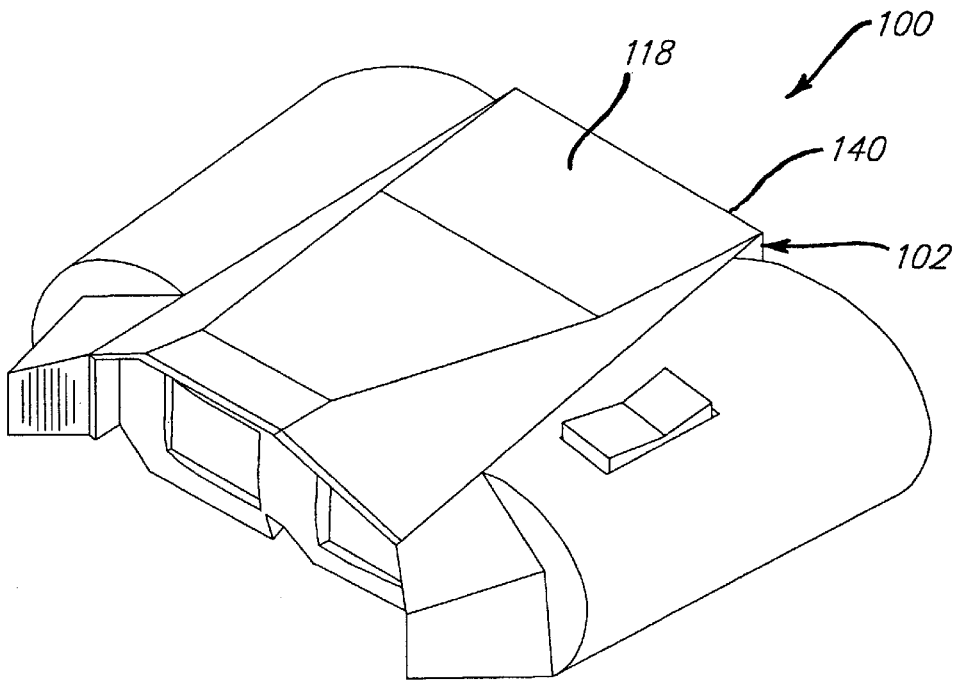
FIG. 5 is an exploded perspective view illustrating the connection of several different optional external modules to the main housing in accordance with the present invention.
Figure 5B:
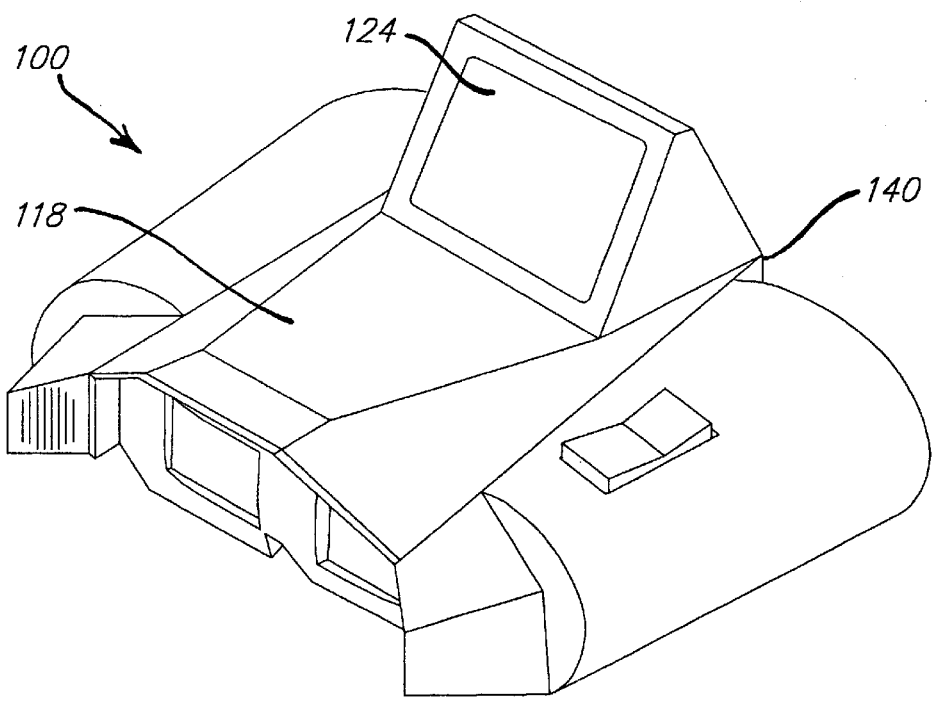

A portable binocular electronic imaging system 100 of the present invention is shown in FIGS. 1–6 as having a main housing 102 containing a binocular viewfinder denoted as binocular viewing subsystem 104, stereo speakers 106, an internal electronic control subsystem 108, a general purpose external input/output interface 110, such as an audio/video jack or a joystick port, and several ports 112, 114, and 116 (which is not actually shown in FIG. 1, but is generally denoted by pointing to the underside of housing 102 where port 116 would be located) for physically and electronically connecting respective accessory modules shown separately in FIG. 5 as a display module 118, an electronic camera module 120, and a video cassette recorder and battery module 122.

The binocular viewing subsystem 104 can be implemented in any manner known to one of ordinary skill in the art which suitably provides an optical subsystem which when configured with the display module 118 provides a binocular wide apparent field of view of the image produced by the display module 118 for viewing by both eyes of the user. In accordance with the present invention, a wide apparent field of view is generally understood to mean a field of view greater than a 40° arc across the viewing field relative to the user's perspective. It will be further understood that the binocular viewing subsystem 104 can be arranged to provide either two separate exit pupils, or alternatively one large exit pupil extending over both eyes of the user.

The display module 118 can be implemented in any manner known to one of ordinary skill in the art to include a display subsystem 124 which presents a graphic or textual image for viewing through the binocular viewing subsystem 104. Examples of suitable display subsystems include, but are not limited to a liquid crystal panel, cathode ray tube, modulated scanning light or electron beam, or a relayed image thereof. Further, the display module 118 may also or alternatively include apparatus/circuitry which facilitates the viewing of either stationary or moving film images through the binocular viewing subsystem 104. Note that while the display module 118 may comprise two separate display subsystems 124, one for each eye, or alternatively may comprise a single large display means, it preferably comprises only one small display to minimize cost, weight and power consumption.

In addition, as particularly illustrated in FIGS. 6(a) and 6(b), the housing for a pop-up display module 118 and/or the main housing 102 are adapted to include a mechanism which permits the display subsystem 124 to be pulled or sprung-up from the main housing 102, or to otherwise facilitate external viewing of the images displayed thereon. The mechanism can be implemented in any suitable manner known to one having ordinary skill in the art, such as but not limited to a pin type hinge, an integrally formed "living hinge" located along edge 140, or even a nonhinged arrangement such as a display unit which slides in and out of the main housing 102, wherein the mechanism can further be provided with a locking cam or mechanical spring arrangement which maintains the display subsystem 124 in the externally deployed position (FIG. 6(b)), and/or a latch mechanism which locks the display subsystem 124 into the internally deployed position (FIG. 6(a)). With the "pop-up" function of the present invention, further flexibility in the utility of the electronic imaging system 100 is effectively achieved by creating dual display configuration.

In the preferred embodiment, the above described feature of providing a binocular wide field of view viewfinder is most advantageously achieved by implementing the binocular viewing subsystem 104 in accordance with the binocular imaging system described in my copending U.S. patent application Ser. No. 08/287,967, now U.S. Pat. No. 5,673, 146, incorporated herein by reference and specifically illustrated in FIGS. 3(a) and 3(b). More particularly, the binocular viewing subsystem 104 includes an objective lens 126 to project the image from the display subsystem 124 to a folding mirror 128, which subsequently reflects the projected image to form an intermediate image proximate a combination positive Fresnel lens 130 and a reflective striped prism beam splitting surface 132. The light forming the intermediate image is partially converged by the Fresnel lens 130, split by the beam splitting surface 132 and again converged by the Fresnel lens 130 to enter two similar but distinct areas of an eye lens 134. The eye lens 134 is focused on the intermediate image to form binocular virtual images of the object image generated by the display subsystem 124.

The folding mirror 128 is placed at or near the center of the two eye lens image areas and angled to position both the objective lens 126 and the object image so as to avoid interference amongst the various light paths. The Fresnel lens 130 and beam splitting surface 132 are preferably formed on a common substrate such that the light passes through the Fresnel lens 130 both upon incidence to and after reflection from the reflective beam splitting surface 132. This Fresnel lens 130 and reflective striped prism beam splitting surface 132 combination is of particular benefit because both structures can be compression molded into an inexpensive single structure which can then be reflection coated on the beam splitter side. However, the combined element could be replaced with a standard field lens and another form of beam splitting surface. The preferred binocular viewing subsystem 104 of the present invention therefore provides a compact viewfinder system which is particularly advantageous because most of the components and their weight are located and/or mounted within the main housing 102 near the user's head, thereby providing a weight distribution which reduces fatigue and burden to the user. With the binocular viewing subsystem 104 arranged as shown in FIGS. 3(a) and 3(b), the corresponding display module 118 may include only the display subsystem 124, or alternatively may include components of the binocular viewing subsystem 104 which would provide the most convenient functional separation between the main housing 102 and the display module 118. In the preferred embodiment, the minimized number and complexity of components of the binocular viewing subsystem 104 provide a low cost and low weight viewfinder capable of producing a wide field of view binocular image particularly suited for the present invention. In addition, this binocular viewing subsystem 104 provides a single entrance pupil and dual large exit pupils, and also an eye relief large enough for a person to use the system without removing eyeglasses. The binocular viewing subsystem 104 is configured within the main housing 102 to minimize obstructions between the user's eyes and the user's environment as seen by looking down. Such configuration may include one wherein the user must look up into the viewer to observe the wide field of view image.

The internal electronic control subsystem 108 can include any readily available circuit and supporting components to connect and control the functions of the invention while providing various options to the user as may occur to one skilled in the art of electronic image systems. User control and selection inputs are provided via an input keypad 133 or similar input device or devices. In accordance with the present invention, such options which can be controlled include, but are not limited to main system and module functional selections and adjustments provided through one or more selection/control menus displayed on the display subsystem 124, picture-in-picture capability to provide images both of an electronic camera image and an external electronic image, and a television tuner. Further, the internal electronic control subsystem 108 may include a lock-out means which can be incorporated and set at the time of manufacture to electronically prevent unauthorized access to particular functions of the electronic imaging system 100.

As noted above, the external input/output interface 110 includes any readily available means for providing connection between the portable electronic imaging system 100 and external input or output devices including, but not limited to external video cassette recorders, televisions, video games, computers, headphones, and power supplies. For example, the external interface can include standard electrical connectors for many typical functions of the present invention as may occur to one skilled in the art of electronic imaging systems, and/or the external interface may include a custom connector, such as a video game cartridge port, for providing external input and output functions as well as direct data access to the internal electronic system. A custom connector advantageously provides the benefit of both a consolidated single connection as well as limiting access to particular functions of the portable electronic imaging system 100 by external devices lacking the appropriate mating connector.

The ports 112, 114, and 116 provide both mechanical and electronic interfaces to match mating configurations on an appropriate system or accessory add-on module. When not in use, i.e., when an accessory module is not mounted to the main housing 102 of the electronic imaging system 100, cosmetic covers (not shown) are used to protect the respective interfaces while providing aesthetic congruity to the main housing 102. Circuitry for controlling the specific operation of each respective accessory module is located primarily within the respective module. However, certain electronic adjustments of any accessory module may be provided through selection/control menus displayed on the display subsystem 124, as noted above.

Optional modules 118, 120, and 122 provide common examples of desirable add-on features which lead to several fields of use for the present invention. As described above, the display module 118 preferably comprises an electronic display such as a conventional liquid crystal panel which provides video and perhaps computer generated images. The electronic camera module 120 comprises any suitable electronic camera system and supporting electronics 121 as may occur to one skilled in the art and includes video and infrared cameras. The video cassette recorder and battery module 122 comprises a compact recorder and player 138 with supporting battery 136 which may be either mounted to a mating interface port, such as located on the bottom surface of the main housing 102 as shown in FIG. 5, or attached to the user's belt and connected to the external input/output interface 110. Such accessory modules may further include a video game module 146, a television tuner module 148 (shown in FIG. 2), a system orientation tracker, such as an electronic compass, a head orientation or position tracker module, a head-mounting apparatus 144 (shown in FIG. 3a), or any such accessory module that may occur to one with ordinary skill in the art. It is further noted that the system orientation tracker can double as the head orientation/ movementtracker when the system is used as an head mounted display.

The various system modules may either be provided with the main system to the user for easy integration, or similarly, a manufacturer may offer integrated systems for specific markets, retaining the ability to change the system only to facilitate manufacturing, in which case such modules may represent individual components responsive to a common system architecture.

Therefore, in accordance with the present invention, the ability to selectively mate one or more modules with the main housing 102 and binocular viewing subsystem 104 provides a versatile design suitable for many applications. For example, in FIG. 5 the main system coupled with an electronic camera module 120 and a video cassette recorder and battery module 122 becomes a binocular camcorder. Such a system without the cassette recorder and battery module becomes an electronic binocular camera as shown in FIG. 4. Alternatively, the main system with a head orientation tracking module and a head-mounting apparatus becomes a virtual reality display system. The main system with only the head-mounting apparatus becomes a personal large screen television viewer.

The modular aspects of invention therefore significantly reduce problems with prior art compact electronic imaging systems for a number of reasons. First, the use of a main system and accessory modules greatly increases the utility of the system. Second, since the viewing system is common to the many configurations of the invention, it receives the benefit of a large market and subsequent resources to facilitate development and production and to reduce costs for every application, including those with smaller markets such as virtual reality and night vision systems. Third, the modular display provides for upgrading the system as display technology improves. Fourth, the resulting products can be purchased incrementally, alleviating the need for a user to face the initial higher cost of a complete system. Thus, the modular aspect of the present invention provides significant advantages even if a conventional monocular viewfinder arrangement were utilized.

The present invention incorporates a unique and synergistic combination of several features, which provides a number of other benefits. More specifically, the low cost binocular viewer with the video camera and cassette record and playback capabilities configured as shown in FIG. 5 provides an improved camcorder with several advantages over previous camcorders. First, the long eye relief of the viewer allows the comfortable use of eyeglasses. Second, the long eye relief also allows the viewer to be positioned away from the user's eyes with a shock absorbing material 142 (shown in FIGS. 1 and 3a) positioned between the forehead and the housing to increase safety. Third, the wide field of view binocular image provides a much more convenient viewfinder. Fourth, the compact housing configuration shown places the camcorder components close to the user's head, increasing the manageability of the device. Fifth, the extension of the housing beyond each eye provides a means for mounting a speaker to be heard by each ear for stereo sound. Another advantage of the invention is the natural cavity within the viewing system which, when made waterproof, increases the buoyancy of the invention to facilitate recovery from water accidents and use in water based environments. Further, by configuring the system with a large eye relief and with minimum obstructions below the viewing system, the user can effectively monitor the view within the camcorder while retaining the ability to scan nearby surroundings, thereby maintaining safety.

When the present invention is configured as a camcorder without the tape record and playback module and accompanying large battery, the present invention becomes essentially an electronic binocular camera with an entirely independent set of advantages over current portable electronic imaging systems. First, the binocular camera provides the convenient use and similar form of a binocular telescope for sporting events, nature study and other uses of conventional optical binoculars. Second, the camera can be combined with an integrated or external television tuner to view and listen to broadcast coverage while monitoring events through the camera using the picture-in-picture capability previously discussed. Third, the binocular camera can be attached through a standard cable to a conventional Video Cassette Recorder (VCR). This feature therefore provides a full video recording capability in any situation where a VCR exists. Since most VCRs are in the user's home, and since most recording occurs in the home, the user saves money by not having to purchase a full camcorder with a built-in VCR. Further, since the home VCR can be used for recording, there is no need to convert from the typically small tape format typical of a camcorder VCR to the standard tape format found in most home VCRs. Finally, since the VCR and large battery integral to conventional camcorders represent a significant amount of the camcorder's weight, the electronic binocular, even if connected to a portable belt-mounted VCR, provides a recording system weighing much less in the user's hands than current camcorders.

The present invention therefore significantly reduces problems with prior art portable electronic imaging systems. While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. An electronic binocular imaging system comprising:
   (a). a portable housing;
   (b). means mounted to said housing for generating an electronic signal representative of scenery external to and within a field of view of said means mounted to said housing;
   (c). an electronic display means supported by said housing for displaying an image representative of said electronically generated signal within said housing; and
   (d). a binocular viewfinder oriented with respect to said housing to permit viewing within said housing by both eyes of a user from a position external to said housing, wherein said binocular viewfinder reimages said displayed image for viewing by both eyes, said binocular viewfinder comprising imaging means for producing an apparent field of view of at least 40°.

2. The system of claim 1 wherein said means for generating an electronic signal comprises a first subsystem module having a video and audio subsystem mounted thereon, and said display means comprises a second subsystem module having a means for reproducing the electronic signal as an image, wherein said housing comprises a first and second external port connector means which permits removable coupling of said first and second modules from the exterior of said portable housing.

3. The system of claim 2 wherein said means for generating an electronic signal further comprises a third subsystem module having a video cassette recorder/playback apparatus mounted thereon, and said housing comprises a third external port connector means which permits removable coupling of said third module from the exterior of said portable housing.

4. The system of claim 1 wherein said portable housing comprises a plurality of module connector ports which permit detachable connection of a corresponding plurality of optional system modules from the exterior of said portable housing.

5. The system of claim 4 further comprising an electronic system control means for electronically controlling each of said plurality of optional modules via a corresponding connection port.

6. The system of claim 4 wherein one of said plurality of optional modules comprises a VCR.

7. The system of claim 4 wherein one of said plurality of optional modules comprises a television tuner subsystem.

8. The system of claim 4 wherein one of said plurality of optional modules comprises a video game subsystem.

9. The system of claim 1 wherein said binocular viewfinder comprises means for producing an eye relief suitable to accommodate a user's eyeglasses.

10. The system of claim 1 further comprising an electronic system control means for processing at least two separate source images to produce a picture-in-picture output for reimaging by said viewfinder.

11. The system of claim 1 wherein said housing further comprises a means for reproducing an audio signal.

12. The system of claim 11 wherein said means for reproducing an audio signal comprises stereo speakers integrally mounted to said main housing in positions proximate to the user's ears when the user is looking into said viewfinder.

13. The system of claim 1 wherein said binocular viewfinder is positioned relative to the user's eyes to provide at least a partially unobstructed field of view below said housing.

14. The system of claim 1 wherein said system is portable housing provides a waterproof assembly, and said housing is formed with a cavity to cause floatation.

15. The system of claim 1 further comprising means for mounting the housing to a user's head.

16. The system of claim 1 further comprising means for tracking the user's head movements and orientation.

17. The system of claim 1 further comprising means for tracking the physical orientation of said system relative to a fixed reference point.

18. The system of claim 1 wherein said housing further comprises a shock absorbing material positioned at a contact point with the user's head.

19. An electronic imaging system comprising:
  (a). a portable housing;
  (b). means operatively coupled to said housing for generating an electronic signal representative of scenery external to and within a field of view of said means operatively coupled to said housing;
  (c). an electronic display means supported by said housing for displaying an image representative of said electronically generated signal within said housing; and
  (d). a viewfinder supported by said housing for reimaging said displayed image for viewing by both eyes of a user, wherein said viewfinder comprises means for producing an intermediate image of the displayed image, and a means for reimaging the intermediate image to produce an apparent field of view of at least 40°.

20. The system of claim 19 wherein said viewfinder comprises a binocular imaging means for reimaging the intermediate image for viewing by both of the user's eyes.

* * * * *